(12) United States Patent
Chen et al.

(10) Patent No.: US 10,211,735 B1
(45) Date of Patent: Feb. 19, 2019

(54) VOLTAGE CONVERTER FOR FAST LOAD TRANSIENT RESPONSE

(71) Applicant: ANPEC ELECTRONICS CORPORATION, Hsinchu (TW)

(72) Inventors: Chih-Yuan Chen, Hsinchu (TW); Zhan-Zhe Huang, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/041,030

(22) Filed: Jul. 20, 2018

(30) Foreign Application Priority Data

Jan. 26, 2018 (TW) .................................. 107102930

(51) Int. Cl.
| H02M 3/158 | (2006.01) |
| H02M 1/32 | (2007.01) |
| H02M 1/08 | (2006.01) |
| H02M 1/00 | (2006.01) |

(52) U.S. Cl.
CPC ........... *H02M 3/1582* (2013.01); *H02M 1/08* (2013.01); *H02M 1/32* (2013.01); *H02M 3/158* (2013.01); *H02M 2001/0009* (2013.01)

(58) Field of Classification Search
CPC ...... H02M 1/32; H02M 3/158; H02M 3/1582; H02M 1/08; H02M 2001/0009
See application file for complete search history.

(56) References Cited

U.S. PATENT DOCUMENTS

| 2016/0294277 | A1* | 10/2016 | Romeo | ............... H02M 3/1582 |
| 2017/0005577 | A1* | 1/2017 | Chen | ............... H02M 3/1582 |
| 2018/0041126 | A1* | 2/2018 | Zhang | ............... H02M 1/083 |
| 2018/0166990 | A1* | 6/2018 | Gibson | ............... H02M 3/158 |

\* cited by examiner

*Primary Examiner* — Kyle J Moody
(74) *Attorney, Agent, or Firm* — Li & Cai Intellectual Property (USA) Office

(57) ABSTRACT

A voltage converter for fast load transient response adapted for a boost type voltage converter determines whether a transient state occurs, that is, whether a load is converted from a heavy load to a light load, according to a transient detection circuit. When the transient state occurs, an inductive current quickly drops to a corresponding current value to accelerate the rate of an output voltage returning to a stable voltage value, and to shorten a time of load transient response, so as to avoid affecting the performance of a load, especially a sensitive load.

7 Claims, 8 Drawing Sheets

VOLTAGE CONVERTER FOR FAST LOAD TRANSIENT RESPONSE

CROSS-REFERENCE TO RELATED PATENT APPLICATION

This U.S. Non-provisional Application for Patent claims benefits of the priority of Taiwan patent application serial no. 107102930, filed Jan. 26, 2018. The entirety of the above-mentioned patent application is hereby incorporated by reference herein and made as a part of this specification.

BACKGROUND

Technical Field

The present disclosure relates to a voltage converter, in particular, to a voltage converter for fast load transient response.

Description of Related Art

Voltage converters are often used to provide different levels of operating voltage for purpose of system power management. An ideal voltage converter is capable of providing a stable output voltage and a wide-range output current so that when the load changes instantaneously, the output voltage can still be stabilized at the original voltage level and quickly provide a corresponding load current, thereby efficiently converting the voltage.

There are many types of voltage converters, for example, buck converters, boost converters, inverter converters, buck-boost converters, etc. FIG. 1 shows a conventional diagram of a voltage converter. As shown in FIG. 1, the voltage converter 10 is used for converting the input voltage Vin to the output voltage Vout to drive a load (represented by a load capacitor Cout).

The voltage converter 10 includes an output stage circuit 12, a gate driver 14 and a decision circuit 16. The decision circuit 16 is coupled between the output stage circuit 12 and the gate driver 14. More specifically, the decision circuit 16 receives a ramp signal Vr and a feedback signal Vf related to the output voltage Vout generated by the output stage circuit 12. The ramp singal Vr is, for example, a fixed frequency signal or a variable frequency signal generated by a triangle-wave generator, so that the voltage converter 10 operates under the fixed frequency control or the variable frequency control.

The decision circuit 16 compares the feedback signal Vf with the ramp signal Vr to generate a comparison result. Then the decision circuit 16 determines a duty-cycle signal Rt according to the comparison result. The gate driver 14 generates gate driving signals Tr1-Trn according to the input voltage Vin, the output voltage Vout, and the duty-cycle signal Rt to periodically control switch elements (not shown in FIGs) of the output stage circuit 12, thereby charging or discharging an inductor (not shown in figures) of the output stage circuit 12, so as to generate an necessary load current Iout and a stable output voltage Vout.

Taking a buck-boost converter operating under a boost mode as an example, FIGS. 2A and 2B show an output stage circuit 22 of a buck-boost converter. As shown in FIG. 2A, the output stage 22 includes a first switch SW1, a second switch SW2, a third switch SW3, a fourth switch SW4, and an inductor L0. An end of the inductor L0 is coupled between the first switch SW1 and the second switch SW2. The other end of the inductor L0 is coupled between the third switch SW3 and the fourth switch SW4. The first switch SW1, the second switch SW2, the third switch SW3, and the fourth switch SW4 are controlled by the gate driving signals Tr1-Tr4 respectively.

As shown in FIG. 2A, when the conventional buck-boost converter operates in the boost mode and charges the inductor L0, the first switch SW1 and the third switch SW3 are turned on and the second switch SW2 and the fourth switch SW4 are turned off. At this time, the output stage circuit 22 forms an inductive charging path RO1 from the input voltage Vin to ground and the charging speed of the inductive current IL0 is Vin/L. As shown in FIG. 2B, when the conventional buck-boost converter operates in the boost mode and discharges the inductor L0, the first switch SW1 and the fourth switch SW4 are turned on and the second switch SW2 and the third switch SW3 are turned off. Then, the output stage circuit 22 forms an inductive discharging path RO2 of which the orientation is from the output voltage Vout to the input voltage Vin as shown in FIG. 2B. However, the current still flows according to a direction from the input voltage Vin to the output voltage Vout, but the discharging speed of the inductive current IL0 is negative, which is −(Vout−Vin)/L.

However, as shown in FIG. 2C, when the load converts from the heavy load to the light load (i.e., the transient state occurs), the load current Iout drops from a high level H1 to a low level L1 rapidly and the output voltage Vout gradually rises back to a stable voltage-level. At this time, the inductive current IL0 will gradually decrease based on the load current Iout. However, the discharging speed is limited by −(Vout−Vin)/L, which means that the discharging speed is related to the input voltage Vin, the output voltage Vout, and the inductive current, and results in a longer load transient response time having a bad impact on the performance of the load (especially the sensitive load).

SUMMARY

An objective of the present disclosure is to provide a voltage converter for fast load transient response, which is adapted for a boost type voltage converter (e.g., a buck-boost converter). More specifically, the voltage converter determines whether a transient state occurs (e.g., a load is converted from a heavy load to a light load) according to a transient detection circuit. When the transient state occurs, an inductive current can quickly drop to a corresponding current value to accelerate a rate of an output voltage returning to a stable voltage value. Therefore, the voltage converter for fast load transient response can shorten a time of load transient response to avoid affecting the performance of a load, especially a sensitive load.

An exemplary embodiment of the present disclosure provides a voltage converter for fast load transient response. The voltage converter includes an output stage circuit, a gate driver, a decision circuit and a transient detection circuit. The output stage circuit has a first switch, a second switch, a third switch, a fourth switch and an inductor. The output stage circuit outputs an output voltage according to an inductive current flowing through the inductor and generates a feedback voltage according to the output voltage. An end of the inductor is coupled between the first switch and the second switch. The other end of the inductor is coupled between the third switch and the fourth switch. The gate driver is coupled to the output stage circuit. The gate driver periodically controls the first switch, the second switch, the third switch and the fourth switch according to a duty-cycle signal in a boost mode to charge or discharge the inductor.

The decision circuit is coupled between the output stage circuit and the gate driver. The decision circuit generates the duty-cycle signal according to the feedback voltage and a ramp signal. The transient detection circuit is coupled to the gate driver and generates a transient trigger signal according to circuit data. The circuit data is related to one or a combination of the inductive current, the output voltage, a time length of the inductor discharging, and a time length of the inductor charging. In response to the transient trigger signal indicating that a load current converts from a heavy load to a light load and the gate driver discharging the inductor, the gate driver turns on the second switch and the fourth switch and turns off the first switch and the third switch.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
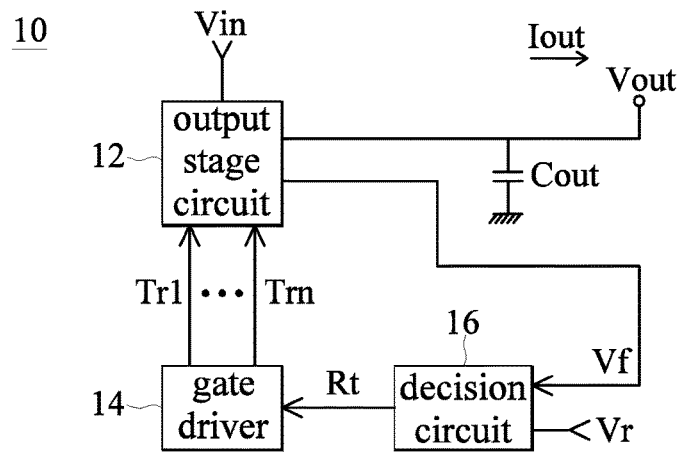
FIG. 1 shows a schematic diagram of a conventional voltage converter.

Reference will now be made in detail to the exemplary embodiments of the present disclosure, examples of which are illustrated in the accompanying drawings. However, the concepts of the present disclosure can be embodied in many different forms, and shall not be construed as being limited by the exemplary embodiments illustrated in this disclosure. Wherever possible, the same reference numbers are used in the drawings and the description to refer to the same or like parts.

The present disclosure provides a voltage converter for fast load transient response, which is adapted for a voltage converter of a boost type (e.g., a buck-boost converter) and uses a transient detection circuit to determine whether a transient state occurs (e.g., a load is converted from a heavy load into a light load). More specifically, the transient detection circuit detects the circuit data related to one or a combination of an inductive current, an output voltage, a time length of the inductor discharging, and a time length of the inductor charging, thereby determining whether the transient state occurs. When the transient state occurs, the inductive current can quickly drop to the corresponding current value to accelerate a rate of an output voltage returning to a stable voltage value. Therefore, the voltage converter for fast load transient response can shorten times of the load transient response to avoid affecting the performance of the load, especially the sensitive load. The voltage converter for fast load transient response provided in the exemplary embodiment of the present disclosure will be described in the following paragraphs.

Figure 3:
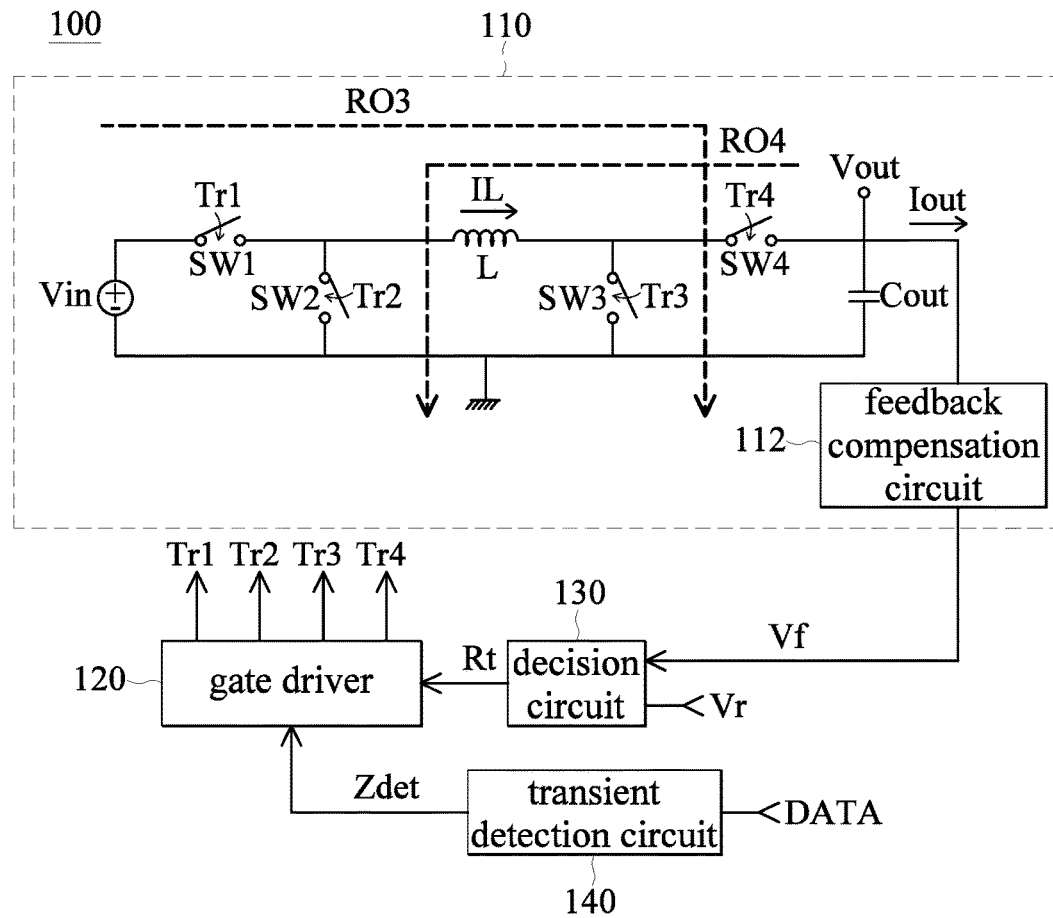
FIG. 3 shows a schematic diagram of a buck-boost converter according to an embodiment of the present disclosure.

Firstly, referring to FIG. 3, a diagram of a buck-boost converter according to an embodiment of the present disclosure is shown. As shown in FIG. 3, the buck-boost converter 100 is used for converting the input voltage Vin into the output voltage Vout to drive a load (represented by a load capacitor Cout). The buck-boost converter 100 includes an output stage circuit 110, a gate driver 120, a decision circuit 130, and a transient detection circuit 140. The output stage circuit 110 has a first switch SW1, a second switch SW2, a third switch SW3, a fourth switch SW4, and an inductor L. An end of the inductor L is coupled between the first switch SW1 and the second switch SW2. The other end of the inductor L is coupled between the third switch SW3 and the fourth switch SW4. More specifically, an end of the first switch SW1 receives the input voltage Vin and the other end of the first switch SW1 connects to ground through the second switch SW2. An end of the fourth switch SW4 connects to ground through the third switch SW3 and the inductor L generates the output voltage Vout through the other end of the fourth switch SW4.

The output stage circuit 110 generates the output voltage Vout according to an inductive current IL flowing through the inductor L and then generates a feedback voltage Vf according to the output voltage Vout. In the present disclosure, the output stage circuit 110 further has a feedback compensation circuit 112 to generate the feedback voltage Vf related to the output voltage Vout.

The gate driver 120 is coupled to the output stage circuit 110. The gate driver 120 periodically controls the first switch SW1, the second switch SW2, the third switch SW3, and the fourth switch SW4 according to a duty-cycle signal Rt in a boost mode to charge or discharge the inductor L. More specifically, the gate driver 120 operates in the boost mode and correspondingly generates the gate driving signals Tr1, Tr2, Tr3, and Tr4 according to the duty-cycle signal Rt to control the turned-on and the turned-off of the first switch SW1, the second switch SW2, the third switch SW3, and the fourth switch SW4.

For example, the gate driver 120 determines that the buck-boost converter 100 operates in the boost mode according to the input voltage Vin and the output voltage Vout. The gate driver 120 turns on the first switch SW1 and the third switch SW3 and turns off the second switch SW2 and the fourth switch SW4 according to the gate driving signals Tr1-Tr4 to charge the inductor L. The gate driver 120 turns on the first switch SW1 and the fourth switch SW4 and turns off the second switch SW2 and the third switch SW3 according to the gate driving signals Tr1-Tr4 to discharge the inductor L.

The decision circuit 130 is coupled between the output stage circuit 110 and the gate driver 120 and generates the duty-cycle signal Rt according to the feedback voltage Vf and a ramp signal Vr. The decision circuit 130 is substantially the same as the decision circuit 16, so detailed description is hereby omitted.

It is worth noting that the transient detection circuit 140 continuously detects whether the buck-boost converter 100 has a transient state (i.e., the load is converted from a heavy load into a light load) during the boost mode the buck-boost converter 100 is operating in. More specifically, the transient detection circuit 140 is coupled to the gate driver 120 and generates a transient trigger signal Zdet according to a piece of circuit data DATA, thereby determining whether the transient state occurs. The aforementioned circuit data DATA is related to one or a combination of the inductive current IL, the output voltage Vout, a time length of the inductor L discharging, and a time length of the inductor L charging.

Figure 4A:
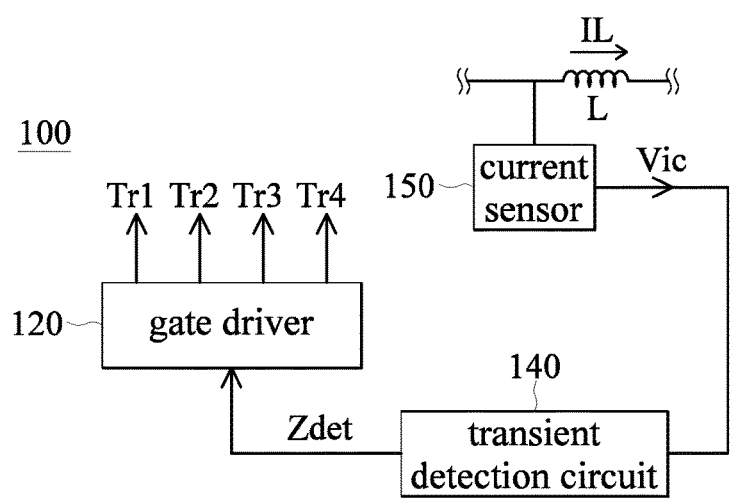
FIG. 4A shows a schematic diagram of a transient detection circuit according to an embodiment of the present disclosure.

For example, the circuit data DATA is a detecting signal (related to the inductor current IL) generated by a current sensor sensing the inductive current IL. Referring to FIG. 4A, the buck-boost converter 100 further includes a current sensor 150. The current sensor 150 is coupled between the output stage circuit 110 and the transient detection circuit 140. The current sensor 150 detects the inductive current IL to generate a detecting signal Vic indicating the inductive current IL and takes the detecting signal Vic as the circuit data DATA shown in FIG. 3.

For another example, the output stage circuit 110 takes the feedback voltage Vf related to the output voltage Vout as the circuit data DATA, the gate driver 120 takes the gate driving signal Tr4 controlling the fourth switch SW4, which is related to the time length of the inductor L discharging, as the circuit data DATA, the gate driver 120 takes the gate driving signal Tr3 controlling the third switch SW3, which is related to the time length of the inductor L charging, as the circuit data DATA, or the buck-boost converter 100 takes relevant node current, the node voltage, and the node signal as the circuit data DATA. However, the present disclosure is not limited thereto.

Figure 4B:
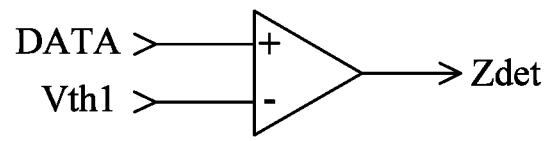
FIG. 4B shows a schematic diagram of a transient detection circuit according to an embodiment of the present disclosure.

Referring to FIG. 4B, in the present disclosure, the transient detection circuit 140 includes a comparator 142. The comparator 142 receives the circuit data DATA (e.g., the detecting signal Vic or the feedback voltage Vf) and a first threshold voltage Vth1. The comparator 142 compares the circuit data DATA with the first threshold voltage Vth1. In response to determining a value of the circuit data DATA is higher than the first threshold voltage Vth1, the comparator 142 generates the transient trigger signal Zdet to the gate driver 120, indicating the load current Iout converts from the heavy load to the light load (i.e., the transient state occurs). In response to determining a value of the circuit data DATA is lower than or equal to the first threshold voltage Vth1, the comparator 142 does not generate the transient trigger signal Zdet indicating the conversion of the load current Tout from the heavy load to the light load (i.e., the transient state does not occur).

Figure 4C:
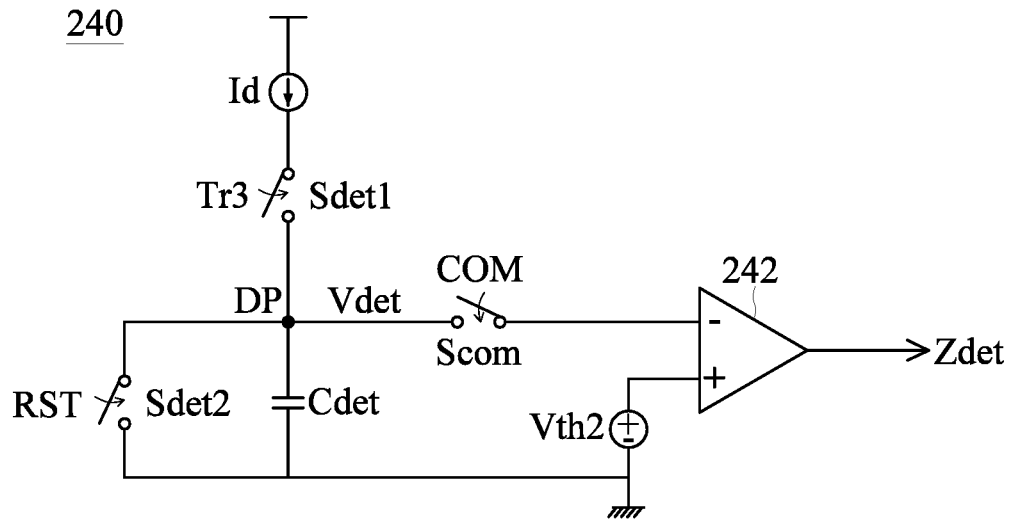
FIG. 4C shows another schematic diagram of a transient detection circuit according to an embodiment of the present disclosure.

In another embodiment, the gate driver 120 takes the driving signal Tr3 of the third switch SW3 as the circuit data DATA. As shown in FIG. 4C, the transient detection circuit 240 includes a detecting switch Sdet1, a reset switch Sdet2, a trigger switch Scom, and a comparator 242. The detecting switch Sdet1 is controlled by the circuit data DATA (e.g., the driving signal Tr3 in this embodiment) to control a current source Id to charge or discharge a detecting capacitor Cdet, and generates a detecting voltage Vdet at a detecting end DP between the detecting switch Sdet1 and the detecting capacitor Cdet.

The comparator 242 has a positive input end and a negative input end. The negative input end is coupled to the detecting end DP through the trigger switch Scom (i.e., controlled by a trigger signal COM). The positive input end receives a second threshold voltage Vth2. The comparator 242 compares the detecting voltage Vdet with the second threshold voltage Vth2 to generate the transient trigger signal Zdet. An end of the reset switch Sdet2 is coupled to the detecting end DP and the other end of the reset switch Sdet2 connects to ground. The trigger switch Scom is controlled by a trigger signal COM. When a value of the circuit data DATA converts from the high level to a low level, the trigger signal COM becomes a pulse signal. The reset switch Sdet2 is controlled by a reset signal RST. In response to the trigger signal COM becoming a pulse signal, the reset signal RST becomes a pulse signal.

Figure 4D:
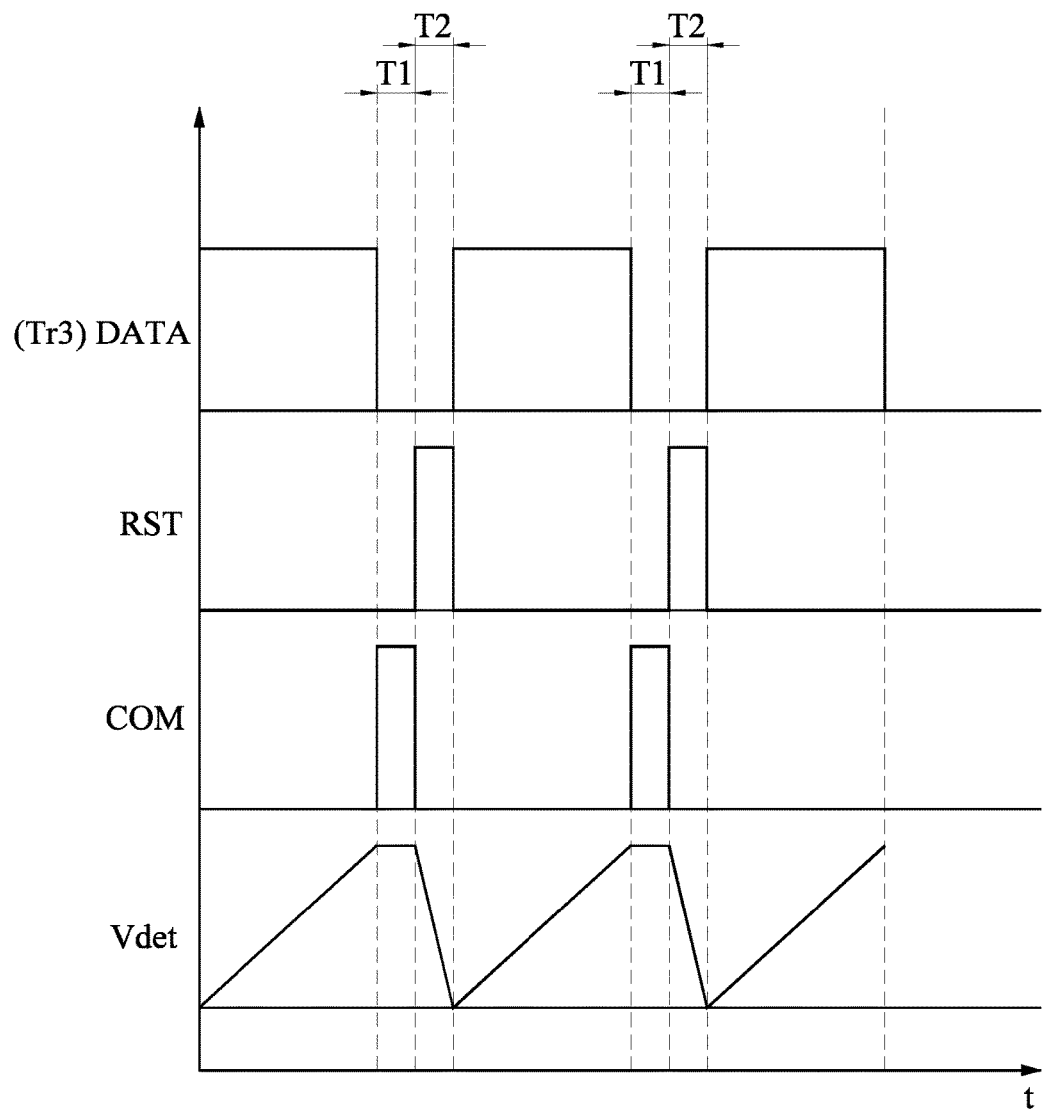
FIG. 4D shows an oscillogram of a transient detection circuit of FIG. 4C.

Referring both to FIG. 4C and FIG. 4D showing an oscillogram produced by the transient detection circuit of FIG. 4C. When a value of the circuit data DATA (e.g., the driving signal Tr3 in this embodiment) is at a high level, the detecting switch Sdet1 is turned on, the trigger switch Scom and the reset switch Sdet2 are turned off to charge the detecting capacitor Cdet. At this time, the detecting voltage Vdet continuously increases.

When the value of the circuit data DATA (e.g., the driving signal Tr3 in this embodiment) converts from the high level to the low level, the detecting switch Sdet1 is turned off and the trigger switch Scom is turned on for a first predefined time T1. After the first predefined time T1, the reset switch Sdet2 is turned on for a second predefined time T2 to discharge the detecting capacitor Cdet. At this time, the detecting voltage Vdet gradually decreases. Then when the circuit information DATA (e.g., the driving signal Tr3 in the present disclosure) converts to the high level, the detecting voltage Vdet increases.

During the first predefined time T1, in response to determining the detecting voltage Vdet is lower than the second threshold voltage Vth2, the comparator 242 generates the transient trigger signal Zdet (e.g., high-level pulse signal in this embodiment) indicating the load current Tout converts from the heavy load to the light load. Conversely, in response to determining the detecting voltage Vdet is higher than or equal to the second threshold voltage Vth2, the comparator 242 does not generate the transient trigger signal Zdet indicating the load current Tout converts from the heavy load into the light load, and outputs, for example, low-level pulse signal.

Figure 4E:
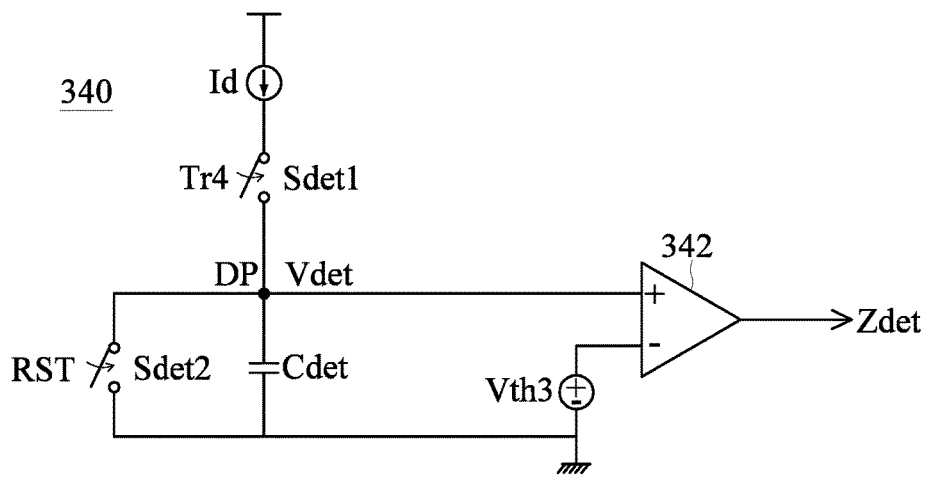
FIG. 4E shows another schematic diagram of a transient detection circuit according to an embodiment of the present disclosure.

In another embodiment, as shown in FIG. 4E, the gate driving circuit 120 takes the driving signal Tr4 of the fourth switch SW4 as the circuit data DATA. The transient detecting circuit 340 includes a detecting switch Sdet1, a reset switch Sdet2, and a comparator 342. The detecting switch Sdet1 is controlled by the circuit data DATA (e.g., the driving signal Tr4 in this embodiment) to control a current source Id to charge or discharge a detecting capacitor Cdet, and generates a detecting voltage Vdet at a detecting end DP between the detecting switch Sdet1 and the detecting capacitor Cdet.

The comparator 342 has a positive input end and a negative input end. The positive input end is coupled to the detecting end DP and the negative input end receives a third threshold voltage Vth3. The comparator 342 compares the detecting voltage Vdet and the third threshold voltage Vth3 to generate the transient trigger signal Zdet. An end of the reset switch Sdet2 is coupled to the detecting end DP and the other end of the reset switch Sdet2 connects to ground. The reset switch Sdet2 is controlled by a reset signal RST. The reset signal RST and the circuit data DATA (e.g., the driving signal Tr4 in this embodiment) are opposite.

Figure 4F:
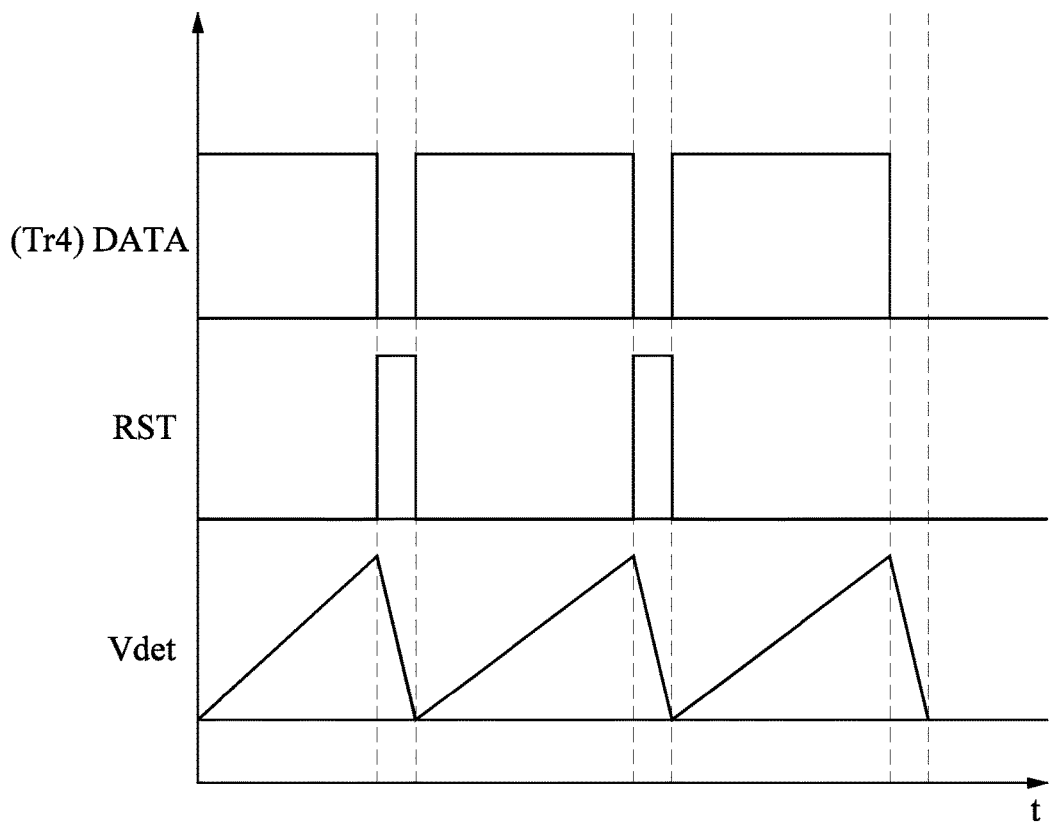
FIG. 4F shows an oscillogram of a transient detection circuit of FIG. 4E.

Referring both to FIG. 4E and FIG. 4F showing an oscillogram produced by the transient detection circuit of FIG. 4E. When a value of the circuit data DATA (e.g., the driving signal Tr4 in this embodiment) is at the high level, the detecting switch Sdet1 is turned on and the reset switch Sdet2 is turned off to charge the detecting capacitor Cdet. At this time, the detecting voltage Vdet continuously increases. When the value of the circuit data DATA (e.g., the driving signal Tr4) converts from the high level to the low level, the detecting switch Sdet1 is turned off and the reset switch Sdet2 is turned on to discharge the detecting capacitor Cdet. At this time, the detecting voltage Vdet continuously decreases. Then when the circuit information DATA (e.g., the driving signal Tr4 in this embodiment) converts to the high level, the detecting voltage Vdet increases.

In response to determining the detecting voltage Vdet is higher than the third threshold voltage Vth3, the comparator 342 generates the transient trigger signal Zdet (e.g., the high-level pulse signal in this embodiment) indicating the load current Iout converts from the heavy load into the light load. Conversely, in response to determining the detecting voltage Vdet is lower than or equal to the third threshold voltage Vth3, the comparator 342 does not generate the transient trigger signal Zdet indicating the load current Iout converts from the heavy load into the light load, and outputs, for example, the low-level pulse signal.

Accordingly, the transient detection circuit 140, 240 and 340 can generate the transient trigger signal Zdet and send the transient trigger signal Zdet to the gate driving circuit 120 according to the circuit data DATA which is related to one or a combination of the inductive current IL, the output voltage Vout, a time length of the inductor L discharging, and a time length of the inductor L charging, thereby informing the gate driver 120 whether a transient state occurs.

Returning to FIG. 3, in response to the transient trigger signal Zdet indicating that the load current Iout converts from the heavy load to the light load (i.e., the transient state occurs) and the gate driver 120 charges the inductor L, the gate driver 120 turns on the first switch SW1 and the third switch SW3 and turns off the second switch SW2 and the fourth switch SW4. At this time, the output stage circuit 110 forms an inductive charging path RO3 from the input voltage Vin to ground.

Figure 2A:
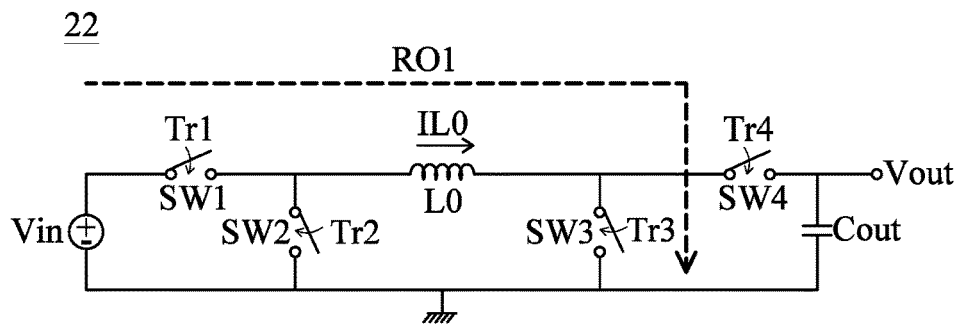
FIG. 2A shows a schematic diagram of an output stage circuit of a conventional buck-boost converter.
Figure 2B:
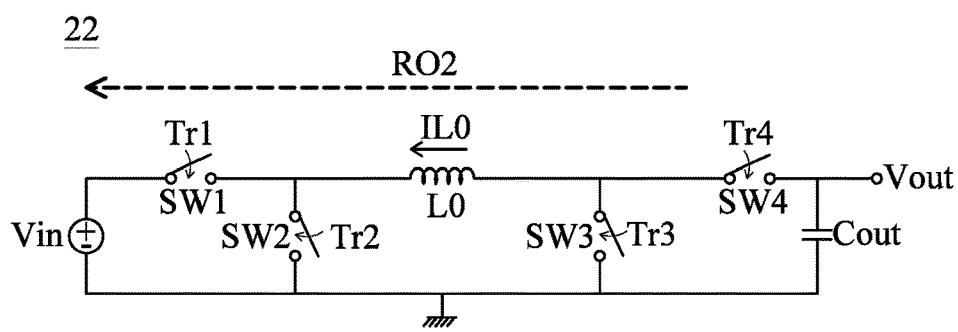
FIG. 2B shows another schematic diagram of an output stage circuit of a conventional buck-boost converter.
Figure 2C:
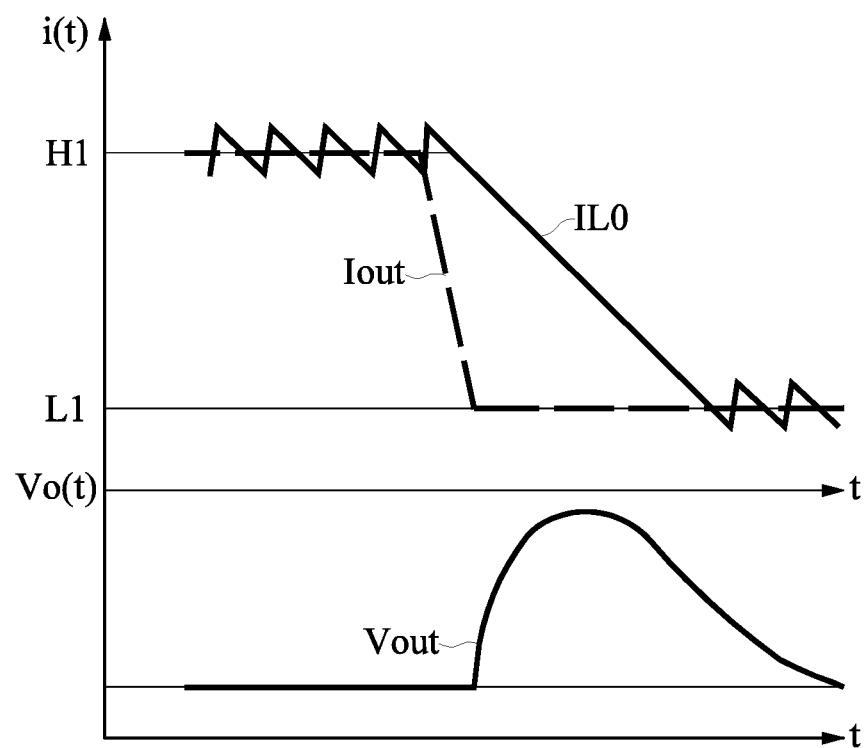
FIG. 2C shows an oscillogram of a conventional buck-boost converter.

In response to the transient trigger signal Zdet indicating that the load current Iout converts from the heavy load to the light load (i.e., the transient state occurs) and the gate driver 120 discharges the inductor L, the gate driver 120 turns on the second switch SW2 and the fourth switch SW4 and turns off the first switch SW1 and the third switch SW3. At this time, the output stage circuit 110 forms an inductive discharging path RO4 of which the orientation is from the output voltage Vout to ground as shown in FIG. 3. However, the current still flows according to a direction from the ground to the output voltage Vout, but the discharging speed of the inductive current IL is negative, which is −(Vout)/L. From the aforementioned exemplary embodiments, when the transient state occurs and the inductor L charges, the charging speed of the inductive current IL is the same as those shown in FIG. 2C. When the transient state occurs and the inductor L discharges, the discharging speed of the inductive current IL is faster than the discharging speed of the inductive current IL shown in FIG. 2C.

Figure 5A:
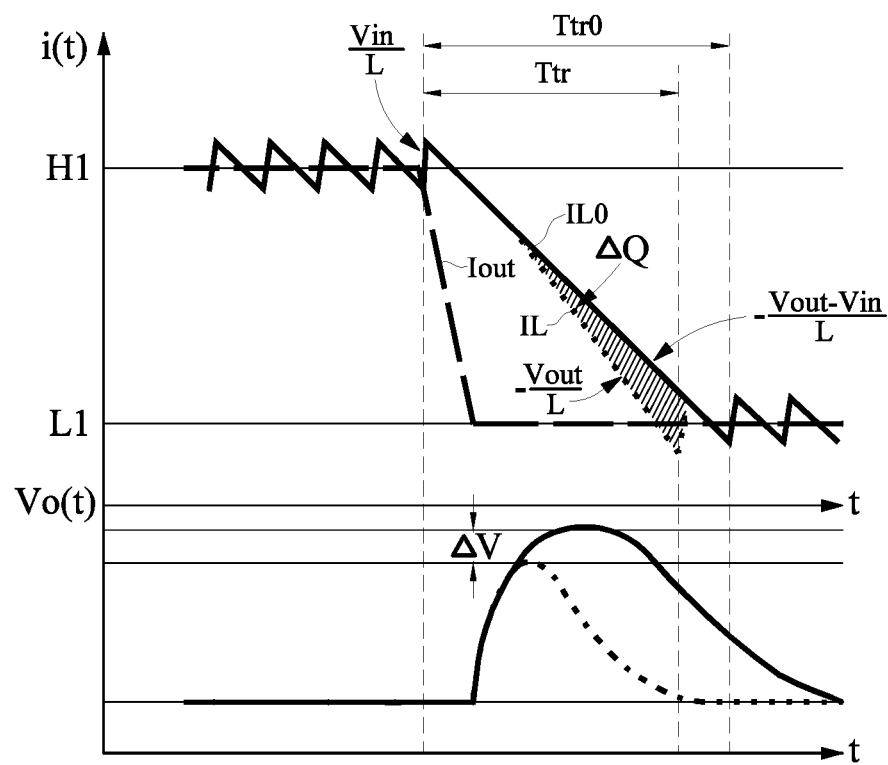
FIG. 5A shows a comparison diagram of a conventional voltage converter and a voltage converter according to an embodiment of the present disclosure under variable frequency operation.

For example, FIG. 5A shows a comparison diagram of a conventional voltage converter and a voltage converter according to an embodiment of the present disclosure under variable frequency operation. As shown in FIG. 5A, when the load converts from the heavy load to the light load (i.e., the transient state occurs), the load current Iout drops from the high level H1 to the low level L1 rapidly. At this time, the charging speed of the inductive current IL0 (shown in solid line) of the conventional voltage converter is Vin/L. The charging speed of the inductive current IL (shown in broken line) of the buck-boost converter 100 of the present disclosure is the same as Vin/L. The discharging speed of the inductive current IL0 ((shown in solid line) of the conventional voltage converter is −(Vout−Vin)/L. The discharging speed of the inductive current IL (shown in broken line) of the buck-boost converter 100 of the present disclosure is −Vout/L.

Accordingly, the discharging speed of the inductive current IL of the present disclosure (i.e., the speed of the load transient response) is faster than the discharging speed of the conventional inductive current IL0, so that the inductive current IL can quickly drop to the corresponding low level L1. Besides, the time Ttr for the inductive current IL of the present disclosure to drop to the low level L1 is shorter than the time Ttr0 for the conventional inductive current IL0 to drop to the low level L1, and therefore the output voltage of the present embodiment returns to a stable voltage level more quickly.

Therefore, the buck-boost converter 100 of the present disclosure can reduce the loss of electric quantity ΔQ, and the reduced electric quantity ΔQ is reflected on the transient response ΔV of the output voltage. The calculation method of the electric quantity ΔQ and the transient response ΔV is described as follows.

$$\Delta Q = \left(\left(\frac{Vout}{L}\right) \times Ttr - \left(\frac{Vout - Vin}{L}\right) \times Ttr\right) \times Ttr = \frac{Vin}{L} \times Ttr^2$$

$$\Delta V = \frac{\Delta Q}{Cout} = \frac{Vin}{Cout \times L} \times Ttr^2$$

Figure 5B:
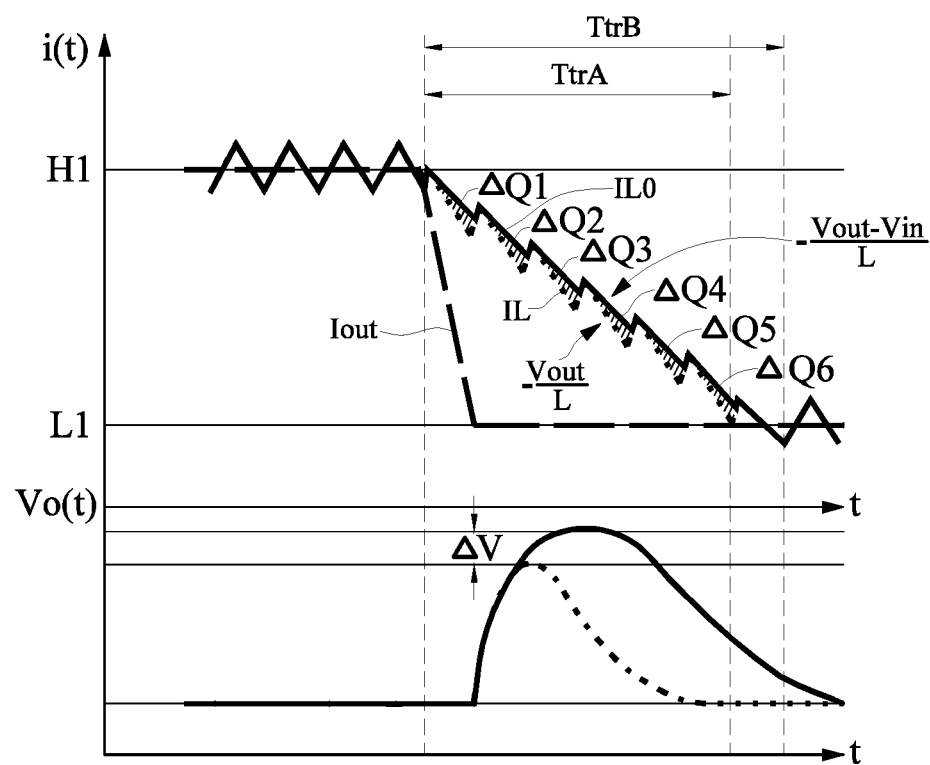
FIG. 5B shows a comparison diagram of a conventional voltage converter and a voltage converter according to another embodiment of the present disclosure under fixed frequency operation.

For another example, FIG. 5B shows a comparison diagram of a conventional voltage converter and a voltage converter according to another embodiment of the present disclosure under fixed frequency operation. As shown in FIG. 5B, when the load converts from the heavy load to the light load (i.e., the transient state occurs), the load current Iout drops from the high level H1 to the low level L1 rapidly. At this time, the charging speed of the inductive current IL0 (shown in solid line) of the conventional voltage converter is Vin/L. The charging speed of the inductive current IL (shown in broken line) of the buck-boost converter 100 of the present disclosure is the same as Vin/L. The discharging speed of the inductive current IL0 ((shown in solid line) of the conventional voltage converter is −(Vout−Vin)/L. The charging speed of the inductive current IL of the present disclosure ((shown in broken line) of the buck-boost converter 100 is −Vout/L.

Accordingly, the discharging speed of the inductive current IL of the present disclosure (i.e., the speed of the load transient response) is faster than the discharging speed of the conventional inductive current IL0, so that the inductive current IL can quickly drop to the corresponding low level L1. Besides, the time TtrA for the inductive current IL of the present disclosure to drop to the low level L1 is shorter than the time TtrB for the conventional inductive current IL0 to drop to the low level L1, so that the output voltage of the present embodiment can return to a stable voltage level more quickly.

Therefore, the buck-boost converter 100 of the present disclosure can reduce the loss of the electric quantity ΔQ=ΔQ1+ΔQ2+ΔQ3+ΔQ4+ΔQ5+ΔQ6, and the reduced electric quantity ΔQ is reflected on the transient response ΔV of the output voltage. The calculation method of the electric quantity ΔQ and the transient response ΔV is the same as the calculation method shown in FIG. 5A. However, the present disclosure is not limited thereto.

In summary, the present disclosure provides a voltage converter for fast load transient response, which is adapted for a boost type voltage converter (e.g., a boost converter or a buck-boost converter operating in the boost mode). More specifically, the voltage converter determines whether a transient state occurs (e.g., a load is converted from a heavy load to a light load) according to a transient detection circuit. When the transient state occurs, an inductive current can quickly drop to the corresponding current value to accelerate a rate of an output voltage returning to a stable voltage value. Therefore, the voltage converter for fast load transient response can shorten times of the load transient response to avoid affecting the performance of the load, especially the sensitive load.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being encompassed by the scope of the present disclosure.

What is claimed is:

1. A voltage converter for fast load transient response, comprising:
    an output stage circuit, having a first switch, a second switch, a third switch, a fourth switch and an inductor and configured to output an output voltage according to an inductive current flowing through the inductor and generate a feedback voltage according to the output voltage, wherein an end of the inductor is coupled between the first switch and the second switch and the other end of the inductor is coupled between the third switch and the fourth switch;
    a gate driver, coupled to the output stage circuit and configured to periodically control the first switch, the second switch, the third switch and the fourth switch according to a duty-cycle signal in a boost mode to charge or discharge the inductor;
    a decision circuit, coupled between the output stage circuit and the gate driver and configured to generate the duty-cycle signal according to the feedback voltage and a ramp signal; and
    a transient detection circuit, coupled to the gate driver and configured to generate a transient trigger signal according to circuit data, wherein the circuit data is related to at least one of the inductive current, the output voltage, a time length of the inductor discharging, and a time length of the inductor charging;
    wherein in response to the transient trigger signal indicating that a load current converts from a heavy load to a light load and the gate driver discharges the inductor, the gate driver turns on the second switch and the fourth switch, and turns off the first switch and the third switch.

2. The voltage converter for fast load transient response according to claim 1, wherein in response to the transient trigger signal indicating that the load current converts from the heavy load into the light load and the gate driver charges the inductor, the gate driver turns on the first switch and the third switch, and turns off the second switch and the fourth switch.

3. The voltage converter for fast load transient response according to claim 1, wherein the transient detection circuit includes:
    a comparator configured to receive the circuit data and a first threshold voltage and compare the circuit data with the first threshold voltage, wherein in response to determining a value of the circuit data is higher than the first threshold voltage, the comparator generates the transient trigger signal indicating the load current converts from the heavy load to the light load.

4. The voltage converter for fast load transient response according to claim 3, further including a current sensor, wherein the current sensor is coupled between the output stage circuit and the transient detector circuit, the current sensor detects the inductive current to generate a detecting signal indicating the inductive current and takes the detecting signal as the circuit data.

5. The voltage converter for fast load transient response according to claim 3, wherein the output stage circuit takes the feedback voltage related to the output voltage as the circuit data.

6. The voltage converter for fast load transient response according to claim 1, wherein the gate driver takes a driving signal controlling the third switch as the circuit data and the transient detection circuit includes:
    a detecting switch, controlled by the circuit data to control a current source to charge or discharge a detecting capacitor and configured to generate a detecting voltage at a detecting end between the detecting switch and the detecting capacitor;
    a comparator having a positive input end and a negative input end, wherein the negative input end is coupled to the detecting end by a trigger switch, the positive input end receives a second threshold voltage, and the comparator compares the detecting voltage with the second threshold voltage to generate the transient detection circuit; and
    a reset switch, wherein an end of the reset switch is coupled to the detecting end, and the other end of the reset switch is coupled to ground;
    wherein when a value of the circuit data is at a high level, the detecting switch is turned on and the trigger switch and the reset switch are turned off to charge the detecting capacitor;
    wherein when the value of the circuit data converts from the high level to a low level, the detecting switch is turned off, the trigger switch is turned on for a first predefined time, the reset switch is turned on for a second predefined time after the first predefined time to discharge the detecting capacitor, and in response to determining detecting voltage is lower than the second threshold voltage during the first predefined time, the comparator generates the transient trigger signal indicating the load current converts from the heavy load to the light load.

7. The voltage converter for fast load transient response according to claim 1, wherein the gate driver takes a driving signal controlling the fourth switch as the circuit data and the transient detection circuit includes:
   a detecting switch, controlled by the circuit data to control a current source to charge or discharge a detecting capacitor and configured to generate a detecting voltage at a detecting end between the detecting switch and the detecting capacitor;
   a comparator having a positive input end and a negative input end, wherein the positive input end is coupled to the detecting end, the negative input end receives a third threshold voltage, and the comparator compares the detecting voltage with the third threshold voltage to generate the transient detection circuit; and
   a reset switch, wherein an end of the reset switch is coupled to the detecting end, and the other end of the reset switch is coupled to ground;
   wherein when a value of the circuit data is at a high level, the detecting switch is turned on and the reset switch is turned off to charge the detecting capacitor, and in response to determining the detecting voltage is higher than the third threshold voltage, the comparator generates the transient trigger signal indicating the load current converts from the heavy load to the light load;
   wherein when a value of the circuit data converts from the high level to a low level, the detecting switch is turned off and the reset switch is turned on to discharge the detecting capacitor.

* * * * *